CALCULATED CONCENTRATION PROFILE IN Pa ISOLATION SYSTEM 3,672,846
Patented June 27, 1972

3,672,846
METHOD FOR REPROCESSING SPENT MOLTEN SALT REACTOR FUELS

Leonard E. McNeese, Oak Ridge, and Don E. Ferguson, Knoxville, Tenn., assignors to the United States of America as represented by the United States Atomic Energy Commission
Filed Apr. 21, 1970, Ser. No. 30,423
Int. Cl. C22b 61/04
U.S. Cl. 23—325                                                      7 Claims

ABSTRACT OF THE DISCLOSURE

A method for reprocessing spent molten metallic fluoride salt mixtures suitable as molten salt breeder reactor fuels is provided wherein uranium, protactinium and certain rare earths are removed from the spent salt mixture prior to recycle of the purified salt mixture back to the reactor. A major fraction of the uranium contained in the spent salt mixture is removed by fluorination with the uranium hexafluoride being reconstituted into the purified salt for return to the reactor. The remaining uranium and protactinium are removed in a protactinium isolation unit by reductive extraction into a molten bismuth solution containing lithium, thorium, and $^{233}$Pa as metal reductants. The extracted uranium is carried out of the unit by the metal solution while the protactinium is held-up within the unit in the bismuth phase. The rare earths are then reductively extracted from the uranium and protactinium-free spent salt mixture in a rare earth removal unit into a molten bismuth solution containing lithium and thorium as metal reductants. The rare earths are then back extracted from the bismuth phase into an acceptor salt selected from lithium chloride, lithium bromide and mixtures thereof. Hydrogen fluoride oxidizers are provided for removal of extracted materials, including fission products which form non-volatile fluorides during fluorination, metal corrosion products, and $^{231}$PaF$_4$, from the bismuth in order to regenerate the bismuth solution. Provision is also made for the separate recovery from the acceptor salt of divalent and trivalent rare earths.

BACKGROUND OF THE INVENTION

The invention herein was made in the course of, or under, a contract with the United States Atomic Energy Commission. It relates generally to methods for reprocessing nuclear reactor fuels and more particularly to a liquid metal reductive extraction method for reprocessing spent molten metallic fluoride salt mixtures suitable as fuels for molten salt breeder reactors.

Extensive investigation of molten metallic fluoride salt mixtures has demonstrated their suitability as nuclear reactor core and blanket fluids. Of recent interest is the use of these salt mixtures in a single fluid, double region molten salt breeder reactor which is described in S.N. 733,843, filed on June 3, 1968, in the names of Edward S. Bettis et al., for "Single Fluid Molten Salt Nuclear Breeder Reactor." In order for a breeder reactor to operate efficiently, means must be provided for the continuous removal of the bred-in protactinium (particularly the long-lived $^{231}$Pa isotope) and certain fission products, viz, rare earth elements of atomic numbers 57–62 of the lanthanide series which generally account for more than 50 percent of the parasitic neutron absorption of the fuel mixture. The other fission products may be maintained at an acceptable neutron poison level by conventional means. Accordingly, the term "rare earths" as used hereinafter is intended to refer only to those elements of atomic numbers 57–62 plus Y, Ba, and Sr.

Reprocessing of spent molten metallic fluoride salt mixtures of protactinium and rare earths has been previously demonstrated utilizing reductive extraction techniques. In one method described in S.N. 749,724, filed on Aug. 2, 1968, now U.S. Pat. 3,472,633, in the names of Leonard E. McNeese et al., for "Liquid-Liquid Removal of Protactinium From Spent Molten Salt Mixtures Containing Uranium Tetrafluoride," the uranium present in the spent salt mixture was extracted from the salt phase into a molten bismuth solution by adjusting the metal reductant contained in the countercurrently flowing bismuth solution to provide a stoichiometric excess of reductant with respect to uranium tetrafluoride. The protactinium values (i.e., protactinium-233 tetrafluoride) were held up in the molten salt phase and concentrated within the extractor by continuous reflux. This method readily removed uranium and protactinium values from the spent molten salt mixture, but it had certain deficiencies. The process required very rigid process control of the flow rates of the bismuth and salt streams (as well as the amount of metal reductant added to the bismuth solution) to insure good separation of the uranium from the protactinium. This will be appreciated from the fact that the uranium was extracted as it entered the bottom of the extraction column and the protactinium was refluxed within the column only when the moles of metal reductant passing down the extraction column in the bismuth solution was just equal to the moles of oxidized material (i.e., uranium and protactinium tetrafluoride) passing up the extraction column. If this delicate oxidant-reductant balance was not achieved either uranium would move up the column or protactinium would pass out of the top of the extraction column in the salt solution. Too, the process offered no method integral to the process for removal of corrosion products, non-volatile fluorides, or fission products especially the long-lived $^{231}$Pa isotope. Moreover, the quantity of metal reductant required was quite large (about 5,000 g. equivalents per day for a 10-day protactinium removal time) inasmuch as all of the uranium and protactinium had to be reductively extracted from the salt phase into the metal phase by reaction with the metal reductant. This process required that the metal reductant be prepared by electrolytically reducing lithium and thorium from fluoride salt present in the system in order to not accrue a significant economic penalty.

Another method for reprocessing spent molten fluoride salt mixtures of protactinium and rare earths was disclosed in S.N. 824,944, now Pat. No. 3,577,225 filed on May 15, 1969, in the names of James H. Shaffer et al., for "Method for Separating Uranium, Protactinium and Rare Earth Fission Products From Spent Molten Fluoride Salt Reactor Fuels." There it was found that uranium, protactinium and the rare earths could be sequentially extracted from the salt phase into molten bismuth by reduction with lithium, beryllium or thorium metal contained in the bismuth solution. This process was quite satisfactory in the efficient separation of the aforementioned elements from the spent salt mixture. Inasmuch as each of the respective elements had to be reductively extracted by reaction with the metal reductants, the cost also was quite high. This process was quite sensitive to variations in the metal or salt flow rates and metal reductant additions.

Thus, the processing methods disclosed thus far leave something to be desired in providing a method for reprocessing spent molten salt mixtures which is easily controlled. Having these difficulties in mind it is an object of this invention to provide a method for reprocessing spent molten salt mixtures suitable for molten salt breeder reactors which does not require large quantities of metal reductant in order that the reductant may be purchased without economic penalty. Another object is to provide a molten salt reprocessing method which is relatively insensitive to changes in process parameters, such as metal and/or salt flow rates and metal reductant additions.

SUMMARY OF THE INVENTION

The invention accordingly, comprises an over-all method for reprocessing spent molten metallic fluoride salt mixtures of protactinium and rare earths, the several chemical processing steps and the relation and order of one or more of the steps with respect to each other being arranged in a novel manner which is exemplified in the following detailed description and drawings. With reference to a 1000 mwe. molten salt breeder reactor (salt volume 1700 ft.$^3$); breeding ratio of 1.063; salt composition of $LiF-BeF_2-ThF_4-UF_4-PaF_4$, 71.7–16–12–0.3–0.0045 mole percent (salt withdrawal rate—170 ft.$^3$/day) the present method, operating on a reprocessing time cycle of 10 days, requires about an order of magnitude less ($\sim$430 vs. $\sim$5,000) equivalents of metal reductants per day than the heretofore best reprocessing method. Unlike all previously devised molten salt reprocessing methods, the process control of the metal extractant and salt flow rates as well as the metal reductants addition rate, do not have to be rigidly controlled to insure good separation of the protactinium and rare earths from salt mixtures.

DESCRIPTION OF THE PREFERRED EMBODIMENT

Figure 1:
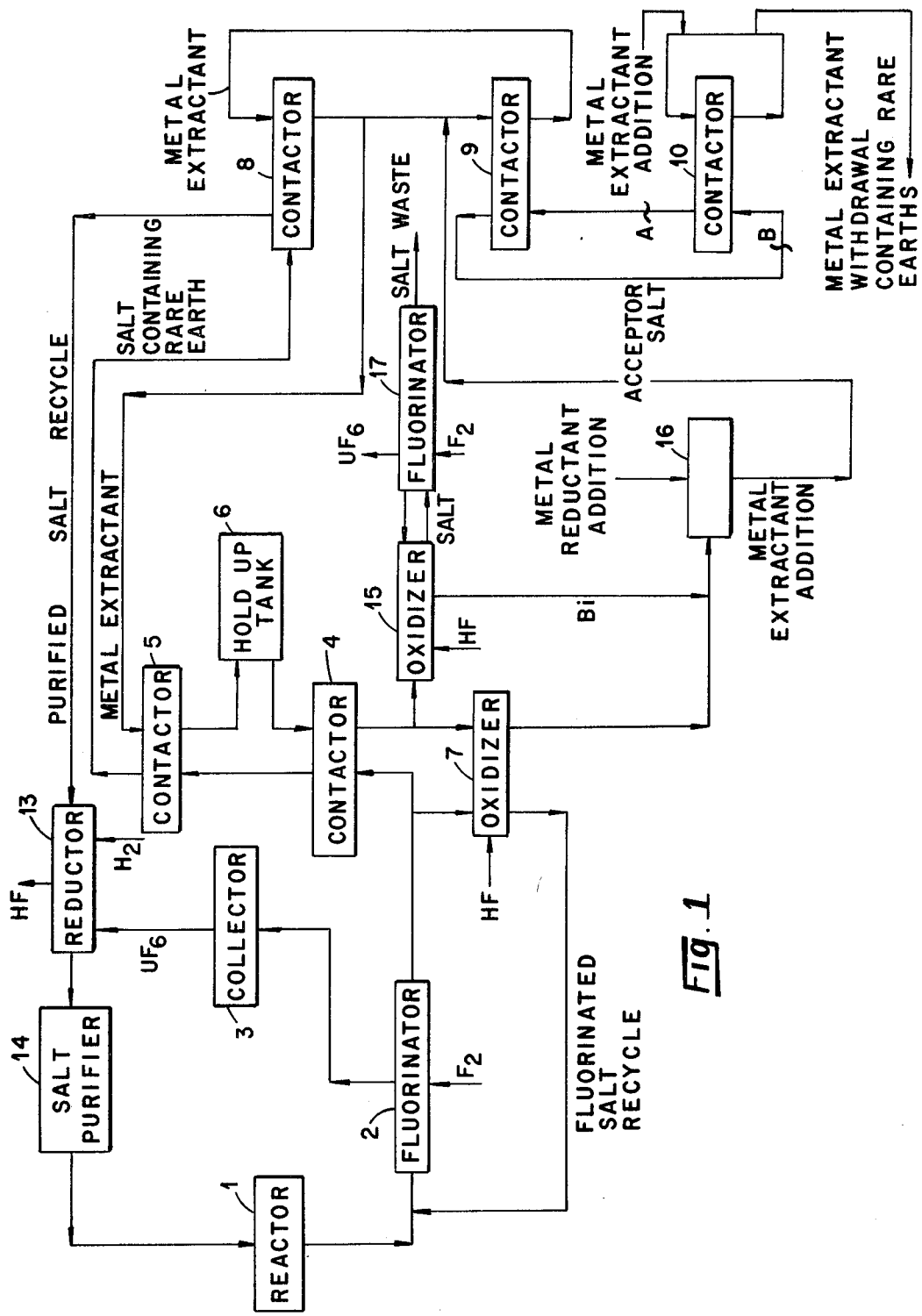
FIG. 1 is a flow diagram of an over-all process for reprocessing a single fluid spent molten metallic fluoride salt mixture.
Figure 2:
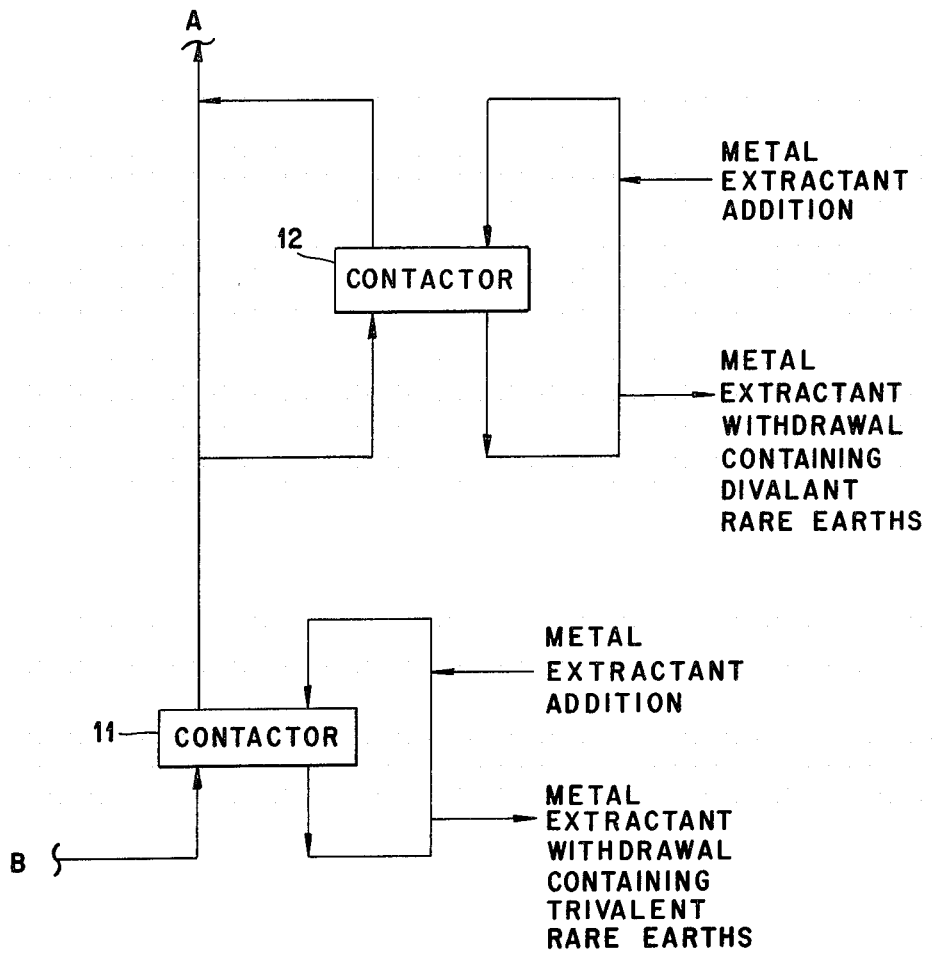
FIG. 2 is an alternative rare earth removal unit wherein the divalent and trivalent rare earths are removed as separate fractions.

To facilitate an understanding of the invention, reference is made to FIGS. 1 and 2 wherein a preferred embodiment of the subject invention is given as a continuous over-all process. The reactor 1 is a single fluid, double region type having a molten metallic fluoride salt mixture of the composition $LiF-BeF_2-ThF_4-UF_4-PaF_4$ (71.7–16–12–0.3–0.0045 mole percent).

Fluorination

Figure 6:
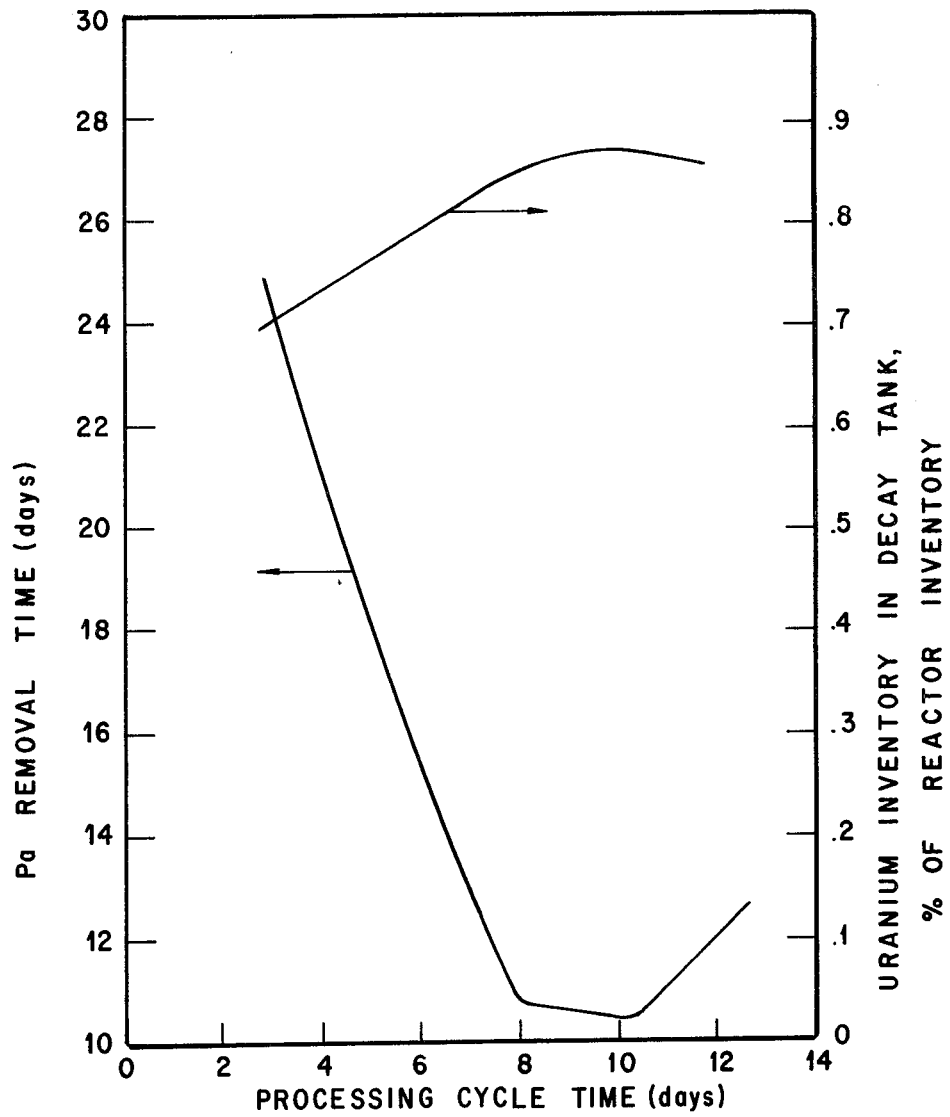
FIG. 6 is a plot showing the effect of the reactor fuel processing cycle time upon protactinium removal time in the protactinium isolation unit.
Figure 7:
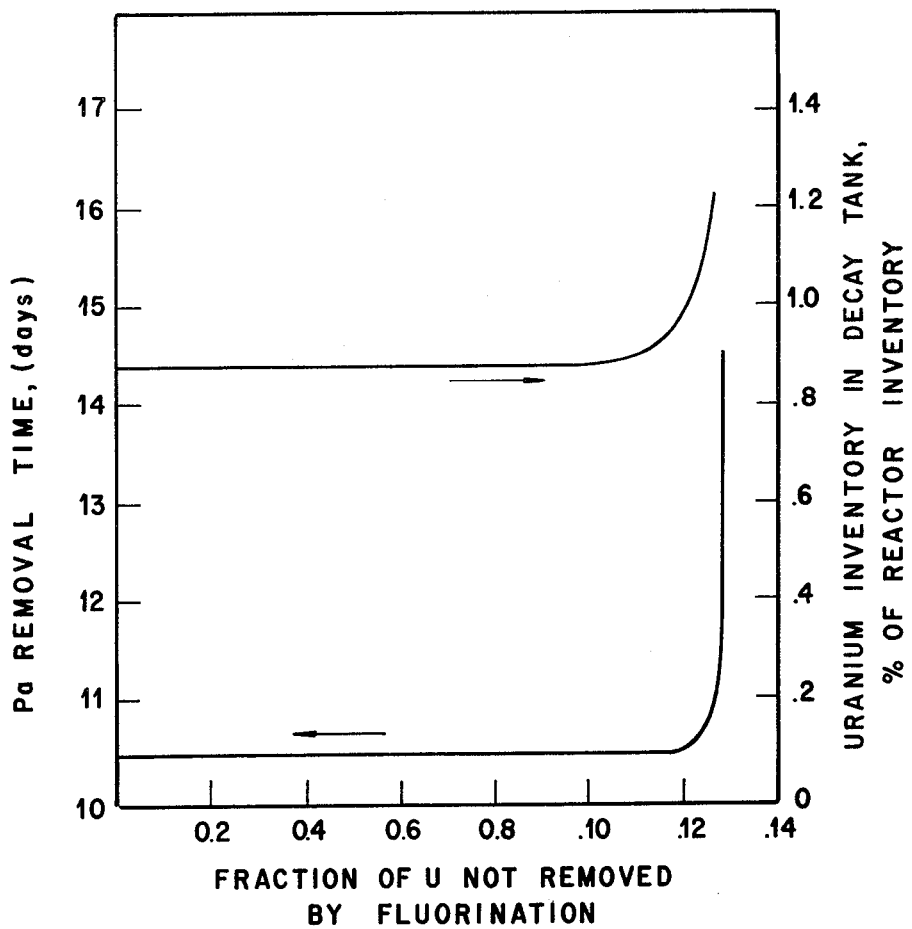
FIG. 7 is a plot showing the effect of uranium not removed by fluorination upon the protactinium removal time in the protactinium isolation unit.

A portion of the molten salt mixture is withdrawn from the reactor and passed to a fluorinator vessel 2. The withdrawal rate for this side stream of spent salt will vary depending upon the economics of the combined reactor-processing system, and for this reactor a ten-day processing cycle time (170 ft.$^3$ salt withdrawal per day) is quite suitable. The effect of changes in the processing cycle time is shown in FIG. 6. The spent molten salt is contacted in the fluorinator with fluorine gas at a temperature of about 520° C. to convert the uranium to the volatile hexafluoride which is then passed to a uranium hexafluoride collector 3 prior to further processing of the uranium hexafluoride to reconstitute the uranium in the purified salt. While a fluorination operation has heretofore been utilized as a means for removing uranium from molten salt mixtures, the prior art process required that better than 99.5 percent of the uranium be removed by this technique. To achieve this extremely high uranium removal efficiency, long fluorination times were required which greatly increased the cost of the over-all process. In the present process the fluorination efficiency for uranium removal can be greatly reduced inasmuch as any residual uranium is removed is the early stages of contacting with the effluent bismuth solution from the protactinium isolation unit. Efficiencies as low as about 88 percent can be employed in the fluorination operation without any deleterious effects on the over-all process economy as shown in FIG. 7. The practice of the invention with regard to protactinium isolation and rare earth removal, as well as other miscellaneous products, will be given hereinafter with reference to a continuous process under steady state conditions.

Protactinium isolation

Figure 3:
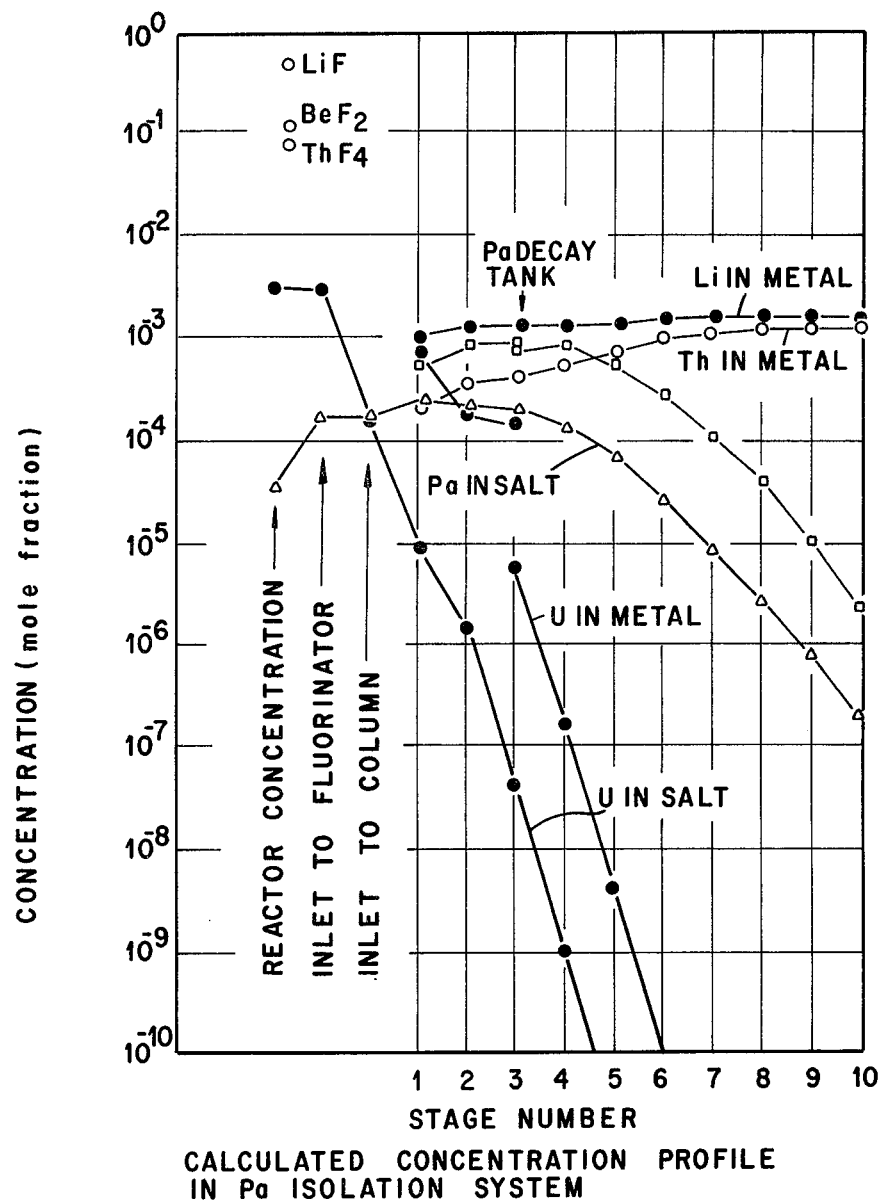
FIG. 3 is a plot showing the calculated concentration profiles of important materials (uranium, protactinium, thorium, and lithium) in the salt and metal phases contained in a protactinium extraction column having an operating temperature of 640° C.
Figure 4:
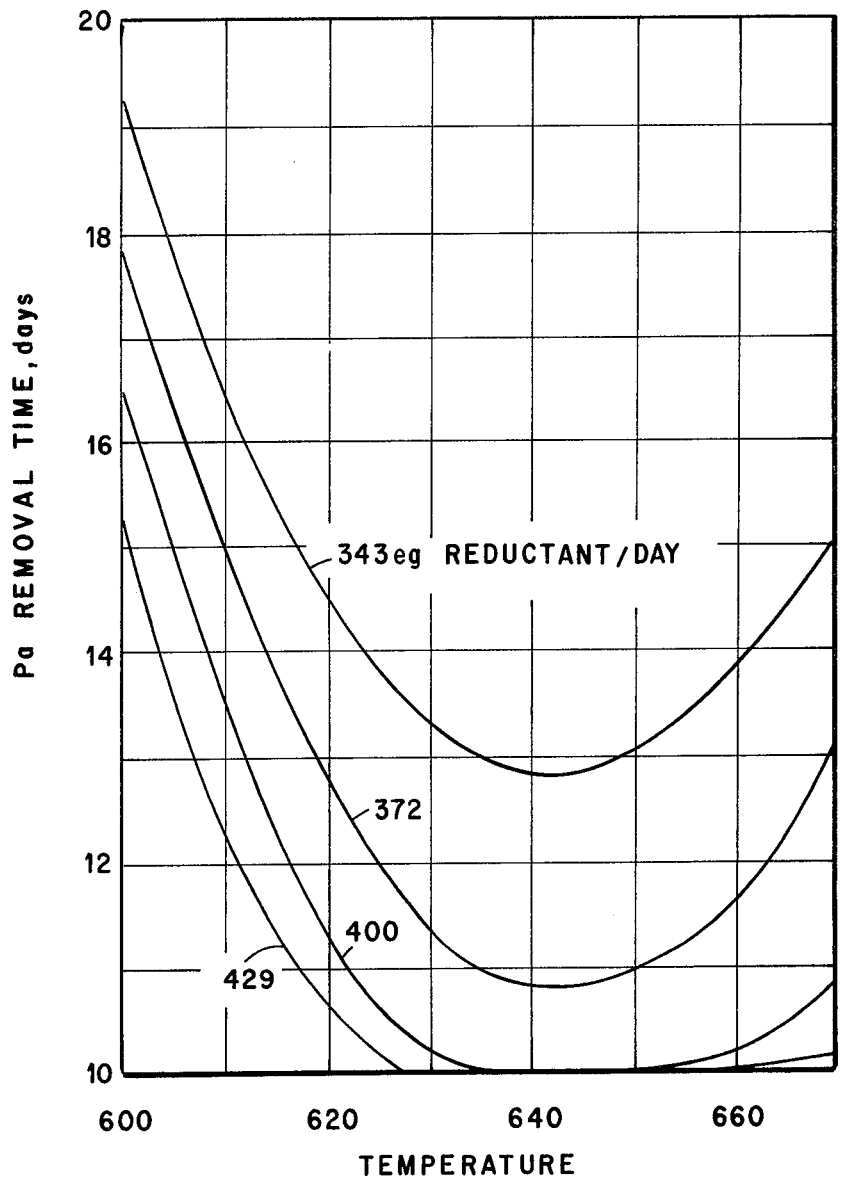
FIG. 4 is a plot showing the effect of temperature upon protactinium removal time for a number of metal reduct addition rates in the protactinium isolation unit.
Figure 5:
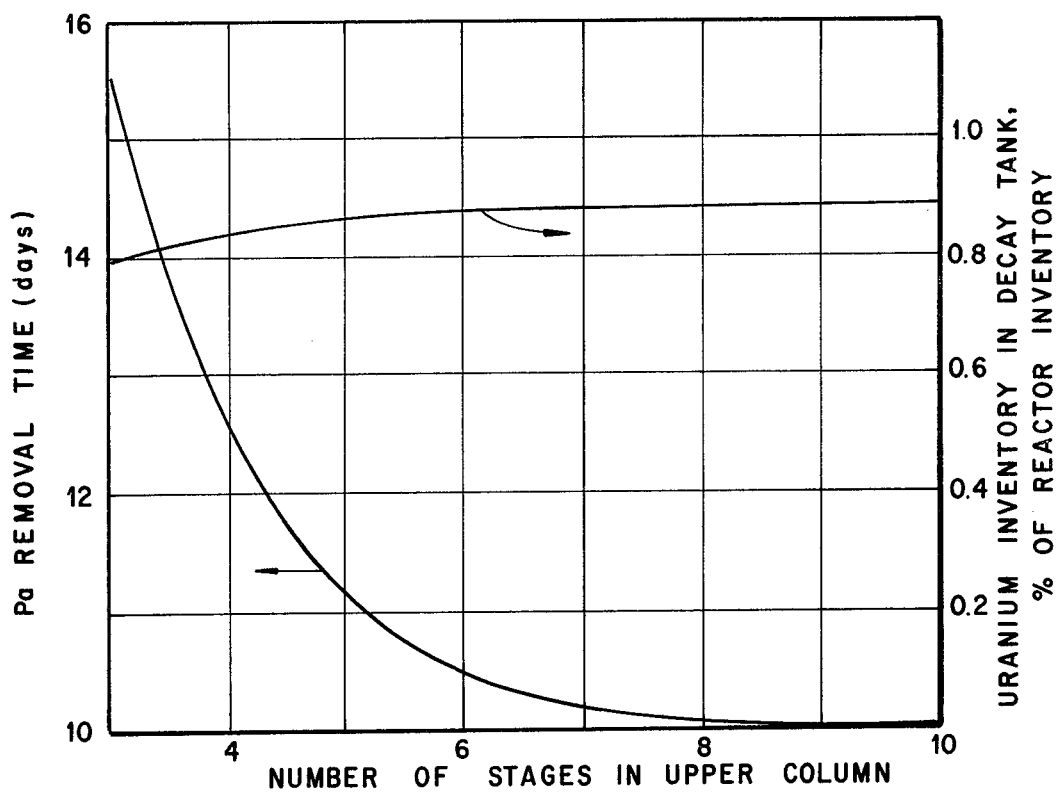
FIG. 5 is a plot showing the effect of the number of stages in the upper contactor of the protactinium isolation unit on the protactinium removal time at 640° C.
Figure 8:
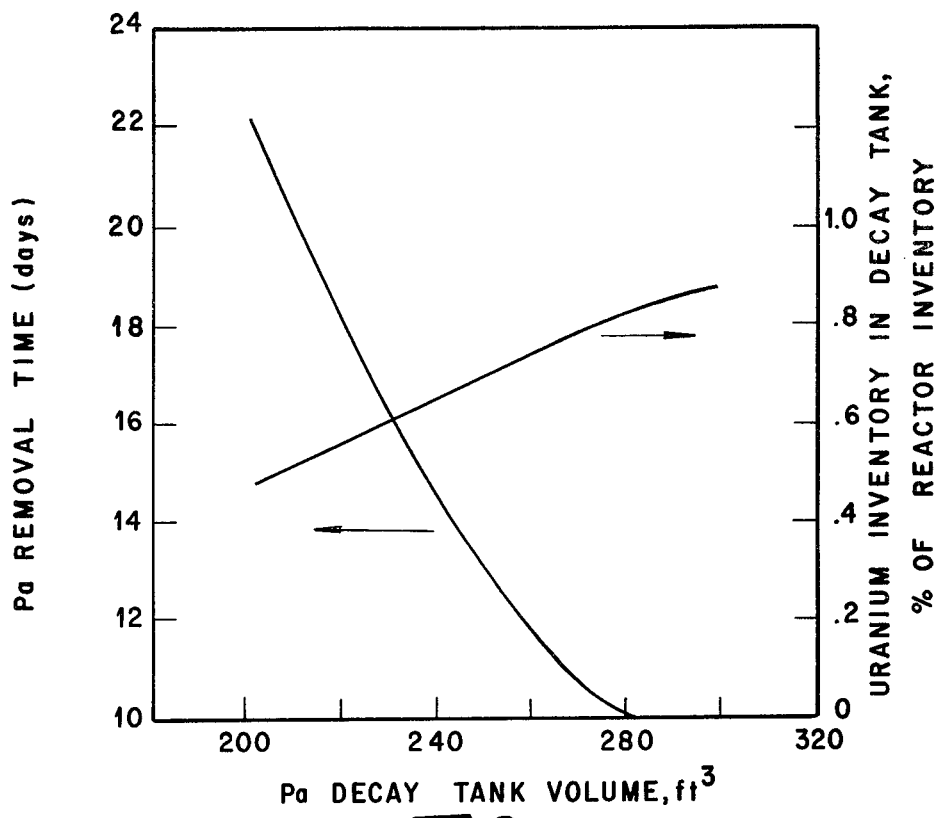
FIG. 8 is a plot showing the effect of variation of the hold-up tank volume upon the protactinium removal time in the protactinium isolation unit.
Figure 9:
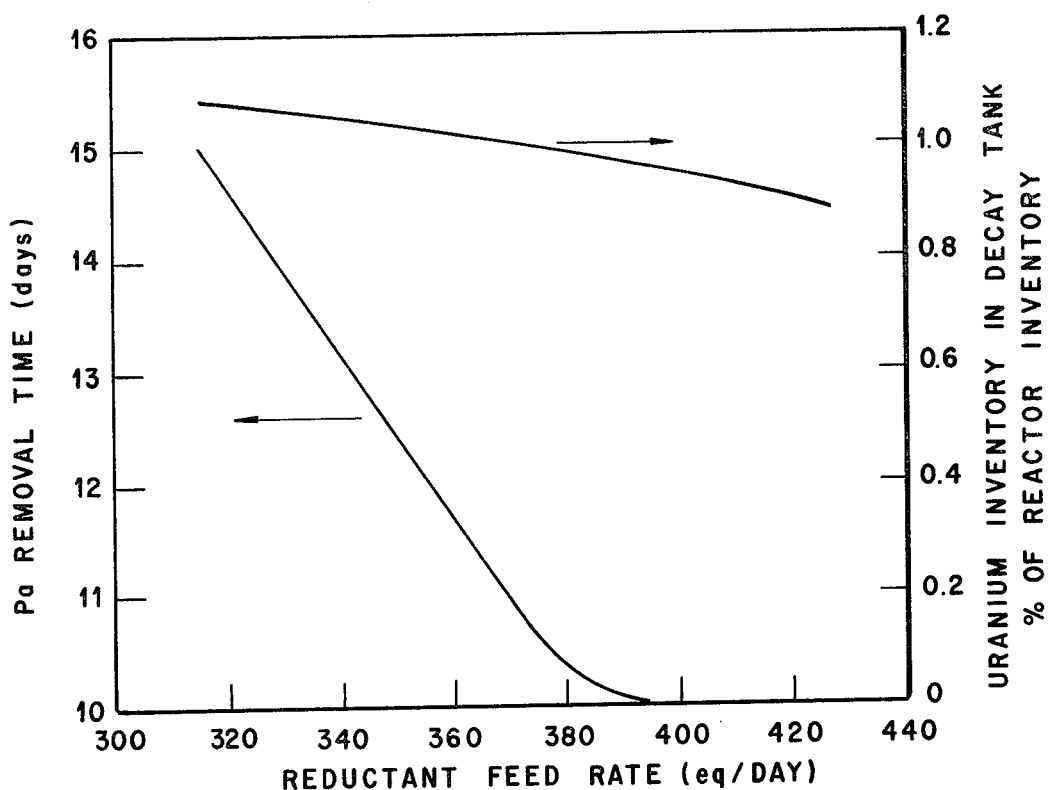
FIG. 9 is a plot showing the effect of variation of the reductant addition rate upon the protactinium removal time in the protactinium isolation unit.

The fluorinated molten salt, except for a small amount which is withdrawn as a side stream, is next passed into an extraction unit comprising a first contactor 4, a contactor 5 and a hold-up tank 6 intermediate to the two contactors. A metal extractant solution comprising a molten bismuth solution which contains minor amounts of a metal reductant selected from the group consisting of lithium, thorium, and mixtures thereof is recycled from the rare earth removal unit, hereinafter described in greater detail, to the extraction unit. Broadly, the extraction unit is operated as a countercurrent liquid-liquid operation to extract the protactinium into the bismuth solution which then flows into the hold-up tank and to extract the remaining uranium from the fluorinated salt into the exiting bismuth solution. These objectives are achieved by the use of several theoretical stages (4 to 8) in contactor 5 and 1 to 2 stages in contactor 4. The effect of varying the number of stages in contactor 5 is shown in FIG. 5. A molten bismuth solution containing thorium at its approximate solubility and an equilibrium concentration of lithium is fed counter-currently to the molten salt solution. The metal-to-salt flow rate ratio is chosen such that the protactinium extraction factor is greater than unity and essentially all of the protactinium is extracted into the bismuth phase as shown in FIG. 3. The molten bismuth solution then flows through the protactinium decay tank which is of sufficient size that most of the protactinium in the reactor system can be held in the tank. The effect of tank volume on protactinium removal time is shown in FIG. 8. The bismuth solution leaving the tank contains protactinium, thorium, and lithium as well as uranium extracted from the salt and $^{233}U$ produced by decay of $^{233}Pa$. This solution then flows into contactor 4 where it is countercurrently contacted with the fluorinated molten salt solution. Most of the uranium (as uranium tetrafluoride) contained in the fluorinated molten salt is reduced to the metal state in contactor 4 by metal reductants ($^{233}Pa$, Th and Li) contained in the bismuth solution and transferred into the bismuth solution exiting from contactor 4. It will be appreciated here that at start up there will not be any $^{233}Pa$ dissolved in the bismuth solution. Initially, the fluorinated molten salt solution containing the remaining uranium values and all of the protactinium proceeds upwardly in contactors 4 and 5 until the protactinium (as protactinium tetrafluoride) is reduced by the metal reductants lithium, thorium, and mixtures thereof to the metallic state and extracted into the bismuth solution. The effect of changes in the reductant addition rate upon temperature and protactinium removal time is shown in FIGS. 4 and 9.

Protactinium in the molten bismuth solution leaving the decay tank will be oxidized to $PaF_4$ by one of two means: (1) reaction with uranium fluoride from the salt phase in contactor 4, or (2) reaction with HF in a step hereinafter described in greater detail. In both cases, the protactinium is returned to the salt solution entering contactor 5 and is available for extraction into the bismuth phase. In this way, the protactinium values will concentrate in the hold-up tank where the $^{233}Pa$ (half-life—27.4 days) will decay to $^{233}U$. To good approximation, the long-lived isotope $^{231}Pa$ (half-life—32,480 years) will not decay but will be carried within the bismuth solution within the protactinium unit until its removal, as described hereinafter in greater detail. In this manner and under steady state conditions the $^{233}Pa$ metal contained in the bismuth serves as a metal reductant to extract the uranium remaining in the fluorinated salt mixture into the effluent bismuth solution of contactor 4. This reductive extraction is regulated by equilibrium reactions of the type:

$$3Pa_{(Bi)} + 4UF_{3(salt)} \rightarrow 4U_{(Bi)} + 3PaF_{4(salt)} \quad (1)$$

By utilizing the proctactinium and residual thorium and lithium as metal reductants the total number of equivalents of metal reductants used to remove the uranium and ioslate the protactinium is reduced and contributes, in part, to the over-all favored economics of the present method. Advantageously, the present method which isolates the protactinium in the metal extraction solution results in a lower heat generation rate in the contactors due to the fact that the continuous phase (salt) which contributes most of the holdup in the contactors has a lower specific power than the dispersed phase (bismuth) since the $^{233}Pa$ concentration in the salt is only about .10 percent of that in the metal at a given point in the extractor 5 as shown in FIG. 3.

A side stream of the fluorinated molten salt mixture is withdrawn prior to the salt solution entering contactor 4 and is passed to a hydrogen fluoride oxidizer 7 where it is contacted cocurrently with the exiting bismuth solution from contactor 4. In the hydrofluorinator, uranium, protactinium values, and any remaining thorium and lithium are oxidized and transferred from the metal phase into the salt phase as fluorides; these values are then recycled to fluorinator 2. This allows the subsequent removal of the uranium as $UF_6$ and returns the protactinium to the salt stream from which it can be extracted in contactor 5.

The effluent molten salt solution from contactor 5, being substantially free of uranium and protactinium values serves as a feed solution for the separate rare earth removal unit.

Rare earth removal

From contactor 5 the molten salt solution containing the rare earths is passed to the rare earth removal unit which consists of three liquid-liquid contactors 8, 9 and 10. In contactor 8, the molten fluoride salt solution is contacted countercurrently with a metal extractant wihch comprises a molten bismuth solution containing lithium and thorium metal as reductants. Part of the rare earths are reduced to the metal state and transferred into the downflowing bismuth solution. The effluent salt solution, being substantially reduced in rare earths, is passed to a uranium hexafluoride reductor 13 prior to recycle to the reactor. In reductor 13 uranium hexafluoride from collector 3 is contacted with hydrogen gas in the presence of the salt and the uranium hexafluoride is reduced and reconstituted in the salt phase; hydrogen fluoride gas is removed as a separate effluent stream. Any bismuth contained in the purified salt is removed prior to recycle to the reactor in salt purifier 14 by countercurrent contact with hydrogen in a column packed with nickel mesh followed by filtration.

The exiting rare earth-laden bismuth solution from contactor 8, with the exception of a side stream which is fed to contactor 5 in the protactinium isolation unit, is next passed to contactor 9 where it is contacted countercurrently with a molten acceptor salt solution selected from lithium chloride, lithium bromide and mixtures thereof. In contactor 9 the rare earths contained in the bismuth solution are oxidized and transferred as rare earth chlorides into the acceptor salt solution. This oxidation reaction proceeds as follows:

$$M_{(Bi)} + nLiCl \rightarrow nLi_{(Bi)} + MCl_n \quad (2)$$

where M represents a rare earth having valence $n$ in the lithium chloride solution. The acceptor salt solution containing the extracted rare earth chlorides is recirculated as a closed loop between contactors 9 and 10 and in contactor 10 is contacted countercurrently with a separate metal extractant comprising a molten bismuth solution which contains a relatively high lithium concentration (0.05 to 0.50 mole fraction), to back extract the rare earth chlorides into the bismuth-lithium solution. Here the rare earth chlorides in the acceptor salt solution are reduced to the metal state and transferred into the bismuth-lithium solution. The bismuth-lithium solution, which contains substantially all of hte extracted metal rare earths, is recirculated only through contactor 10.

A small part (22.7 liter/day) of the effluent bismuth-lithium solution from contactor 10 is withdrawn for removal of the rare earths and regeneration of the bismuth solution. Similarly, a small make up solution (22.7 liters/day) of the same bismuth-lithium content is added to the recirculating bismuth solution at the metal entrance of contactor 10. The method by which the rare earths are removed from the withdrawn bismuth solution forms no part of the invention. Such removal may be made by conventional techniques such as hydrofluorination or hydrochlorination in the presence of a waste salt.

Applicants have found that the divalent and trivalent rare earths may be further separated in the rare earth removal unit. This is achieved, broadly, by utilizing separate metal extractant recycle streams in early and late extraction stages of the rare earth removal unit. Referring to FIG. 2 the acceptor salt is passed to contactor 11 where it is contacted countercurrently with bismuth-lithium solution having a lithium concentration of 0.05 mole fraction to extract the trivalent rare earths into the bismuth-lithium solution; a side stream of the exiting bismuth-lithium solution is withdrawn with an identical make-up bismuth-lithium solution being added at the metal entrance of contactor 11. The effluent acceptor salt from contactor 11 containing the remaining divalent rare earths is then passed to contactor 12 where it is contacted countercurrently with a bismuth-lithium solution having a lithium concentration of 0.5 mole fraction to extract the divalent rare earths into the bismuth-lithium solution; a side stream of the exiting bismuth-lithium solution is withdrawn with an identical makeup bismuth-lithium solution being added at the metal entrance of contactor 12. The effluent acceptor salt from contactor 12 is then passed to contactor 9 (shown in FIG. 1).

Removal of miscellaneous products

A side stream of the exiting bismuth solution from contactor 4 is withdrawn to remove, along with uranium and protactinium, materials which form non-volatile fluorides; these include fission products, $^{231}PaF_4$, and metal corrosion products. The side stream is diverted to a hydrogen fluoride oxidizer 15 where it is contacted with hydrogen fluoride gas. In the oxidizer most of the materials in the bismuth reaction with the hydrogen fluoride to form a molten salt having a composition which is dependent on the concentration of materials such as lithium and zirconium in the withdrawn stream. This composition is thus dependent on operating conditions and in the event that the resulting salt liquidus is too high, additional waste salt can be added to the fluorinator to produce the desired liquidus. Bismuth, which is substantially free of all contaminants, is removed as a separate effluent stream and is combined with bismuth effluent from hydrogen oxidizer 7. The resulting purified bismuth solution is passed to reductant addition 16 where metal reductants—lithium and/or thorium—are added prior to recycle to the rare earth removal unit at the metal entrance end of contactor 9. In this way, it may be seen that materials such as uranium and protactinium are removed from the bismuth solution flowing through contactors 8 and 9 which would otherwise tend to accumulate in this solution. The consequences of such accumulation include: (1) decreased efficiency for rare earth extraction, and (2) loss of fissile material from the system. It should be noted that with this mode of operation, contactor 8 further aids in removing protactinium from the spent metallic fluoride salt and thus allows the use of fewer stages in contactor 5.

The molen salt formed in hydrogen fluoride oxidizer 15 is passed to a fluorinator 17 where any uranium is converted to the volatile hexafluoride by contact with fluorine gas at about 550° C. and all non-volatile fluorides, including $ZrF_4$, $^{231}PaF_4$, and metal corrosion products are retained in the fluoride salt. The effluent uranium hexafluoride from fluorinator 17 may be combined (not shown) with the uranium hexafluoride from collector 3 prior to passing the product to reductor 13. The fluoride salt containing $ZrF_4$, $^{231}PaF_4$, other non-volatile fluoride products, and metal corrosion products may be disposed of by conventional means.

The present invention is further illustrated by the following specific but non-limiting example which describes a continuous reprocessing method for removing protactinium and rare earths from a spent molten metallic fluoride salt mixture.

EXAMPLE

A molten metallic fluoride spent salt solution having the composition 71.7–16–12–0.3–0.0045 mole percent $LiF$-$BeF_2$-$ThF_4$-$UF_4$-$PaF_4$ and containing rare earths at a total concentration of about 0.004 mole percent is withdrawn from a 1000 mwe. single fluid, double region molten salt breeder reactor (salt volume of 1700 ft.$^3$) at a rate of 170 ft.$^3$/day.

Fluorination

The withdrawn salt solution is fed (flow rate—0.97 g.p.m.) to a first fluorinator operated at about 520° C. where it is contacted with fluorine gas (1200 moles/day). Approximately 95 percent of the uranium is removed from the spent salt solution as volatile uranium hexafluoride. The uranium hexafluoride product is then fed to a collector from which it flows to a reductor. There the uranium hexafluoride is reduced with hydrogen gas (1200 moles/day) and reconstituted into a purified molten salt solution for reactor recycle.

Protactinium isolation

About ninety percent of the fluorinated salt solution leaving the fluorinator is fed at a flow rate of about 0.88 g.p.m. to a first liquid-liquid contactor having two (2) theoretical stages where the salt solution is countercurrently contacted with a molten bismuth solution (flow rate—0.13 g.p.m.) which contains about 0.012 gram-equivalents of reduced metals per gram-mole of bismuth. Essentially all (>99.9%) of the uranium is selectively extracted from the salt solution by reaction with metallic protactinium which enters the contactor at a concentration of about 0.000792 mole fraction.

The salt solution leaving the first contactor, having a protactinium concentration of about 0.000148 mole fraction, is countercurrently contacted with a molten bismuth solution having an initial concentration of about 0.0025 mole fraction thorium and about 0.002 mole fraction lithium in a second liquid-liquid contactor having eight (8) theoretical stages. Essentially all (>99%) of the protactinium is extracted from the salt solution into the downflowing bismuth solution in the contactor. The protactinium concentration in the bismuth solution leaving the second contactor is about 0.00105 mole fraction and in the salt solution leaving the second contactor is about $0.82 \times 10^{-8}$ mole fraction. The operating temperature of both liquid-liquid contactors is about 640° C.

The bismuth solution leaving the second liquid-liquid contactor flows through a protactinium decay tank which has a volume of 300 ft.$^3$. The inlets and exit protactinium and uranium concentrations are 0.001045, $0.92 \times 10^{-5}$, $0.792 \times 10^{-3}$, and $0.263 \times 10^{-3}$ mole fraction, respectively. About eighty (80) percent of the protactinium in the reactor system is contained in the metal phase within the decay tank which has a $^{233}Pa$ inventory of about 447 moles.

Removal of miscellaneous products

About five (5) percent of the molten bismuth solution (0.012 g.p.m.) leaving the first liquid-liquid contactor which contains dissolved lithium, zirconium, uranium, $^{231}Pa$, $^{233}Pa$, as well as metallic corrosion products and other fission products, is contacted with hydrogen fluoride (33 moles/day) in a first oxidizer to form a salt solution consisting of fluorides of lithium, zirconium and other materials and having a composition of approximately 50–50 mole percent $LiF$-$ZrF_4$. The resulting salt solution is contacted with fluorine gas (about 60 moles/day) in a second fluorinator at about 550° C. in order to recover essentially all of the uranium as volatile uranium hexafluoride. The remaining salt solution is then held for a period of about 270 days to insure that essentially complete decay of $^{233}Pa$ to $^{233}U$ is effected and the salt solution is again fluorinated to recover the $^{233}U$ product by decay of $^{233}Pa$ before discard of the salt solution which contains fission product, zirconium, $^{231}Pa$, and metallic corrosion products.

About ten (10) percent of the salt solution leaving the first fluorinator (about 0.088 g.p.m.) and about ninety-five (95) percent of the bismuth solution (about 0.12 g.p.m.) leaving the first liquid-liquid contactor are contacted with hydrogen fluoride (about 650 moles/day) in a second oxidizer to effect the transfer of materials dissolved in the bismuth solution to the salt solution which is then recycled to the inlet of the first fluorinator.

Divalent and trivalent rare earth removal

The salt solution leaving the first liquid-liquid contactor of the protactinium isolation unit is fed to a first liquid-liquid contactor in the rare earth removal unit. This contactor consists of six (6) theoretical stages and the salt solution is countercurrently contacted with a molten bismuth solution (12.5 g.p.m.) containing lithium and thorium at concentrations of 0.002 and 0.0025 mole fraction and there the rare earths are reductively extracted from the salt solution into the bismuth solution. The rare earth-laden bismuth solution is then countercurrently contacted in a second liquid-liquid contactor, which consists of six (6) theoretical stages, with an acceptor salt comprising a molten lithium chloride solution (~33 g.p.m.). The lithium chloride solution containing the extracted rare earths is fed to a third liquid-liquid contactor which consists of one (1) theoretical stage where it is countercurrently contacted with a bismuth solution (~8.3 g.p.m.) containing 0.05 mole fraction lithium. In this contactor essentially all of the trivalent rare earths are removed from the salt solution by extraction into the bismuth phase. A bismuth make-up solution (22.7 liters/day) containing about 0.05 mole fraction lithium is added to the recycling trivalent rare earth-laden bismuth solution and a similar bismuth solution containing the trivalent rare earths and lithium at concentrations of 0.005 and 0.05 mole fraction, respectively, is withdrawn from the recycling bismuth solution.

Approximately two (2) percent of the lithium chloride solution (~0.66 g.p.m.) leaving the third liquid-liquid contactor is fed to a fourth liquid-liquid contactor which consists of 3 theoretical stages. There the divalent rare earths are removed. A bismuth solution containing lithium at a concentration about 0.5 mole fraction is fed (22.7 liters/day) to the fourth contactor at a flow rate of about 2.3 liters/day and a bismuth solution containing the divalent rare earths at a concentration of about 0.005 mole fraction and a lithium concentration of about 0.05 mole fraction is withdrawn from the recycling bismuth solution.

The lithium chloride solution exiting the fourth contactor is combined with the remaining lithium chloride solution (that not passed through the fourth contactor) exiting the third contactor (~32.3 g.p.m.) and the resulting salt solution is recycled to the second contactor of the rare earth removal unit to form a closed loop.

What is claimed is:

1. A method for reprocessing spent molten metallic fluoride salt mixtures containing uranium, protactinium and rare earths comprising the steps of:
   (a) fluorinating said molten salt mixture to cause volatilization of a major fraction of said uranium;
   (b) withdrawing a minor fraction of said fluorinated molten salt solution;
   (c) establishing a countercurrent flow of the remaining fluorinated molten salt solution and a molten bismuth solution containing a first metal reductant selected from the group consisting of lithium, thorium and mixtures thereof in a unit consisting of a first contactor (4), a second contactor (5) and a hold-up tank (6) intermediate to said contactors to thereby isolate protactinium in the bismuth solution in said hold-up tank;
   (d) adjusting the flow rates of said molten salt solution and bismuth solution in said unit to cause:
      (i) in said first contactor (4) uranium to be reductively extracted from the entering molten salt solution into the exiting bismuth solution by a second metal reductant selected from the group consisting of $^{233}$Pa, Th, and Li, and mixtures thereof contained in said bismuth solution;
      (ii) in said second contactor (5) protactinium and the remaining uranium to be reductively extracted from the entering molten salt solution into the exiting solution by said first metal reductant; and
      (iii) in said hold-up tank (6) substantial decay of $^{233}$Pa to $^{233}$U in said bismuth solution;
   (e) contacting said minor fraction of said molten salt solution from step (b) with a part of said exiting bismuth solution from step (d) (i) from said first contactor and hydrogen fluoride gas in an oxidizer (7) to cause uranium, protactinium and zirconium to transfer as fluorides into the molten salt solution;
   (f) recycling said molten salt solution containing said fluorides to a fluorinator (2) as input;
   (g) contacting the exiting molent salt solution from said second contactor with bismuth solution containing a metal reductant selected from the group consisting of lithium, thorium and mixtures thereof to cause the rare earths to be reductively extracted from the molten salt solution to the bismuth solution;
   (h) recovering fission products from the bismuth solution; and
   (i) thereafter recovering the purified molten salt solution.

2. The method of claim 1 wherein said molten metallic fluoride salt mixture comprises LiF-BeF$_2$-ThF$_4$-UF$_4$- (71.7–16–12–0.3 mole percent).

3. The method of claim 1 wherein said first metal reductant is provided in concentrations of .002 mole fraction lithium and 0.0025 mole fraction thiorium.

4. The method of claim 1 wherein said fluorination step is conducted with fluorine gas at 520° C. with from 88–95 percent uranium removed as uranium hexafluoride.

5. The method of claim 1 wherein said reductive extraction in said unit is carried out at a temperature of about 640° C.

6. The method of claim 1 further comprising the step of contacting the remainder of the bismuth solution issuing from said first contactor with hydrogen fluoride gas in an oxidizer (15) to form a molten salt which includes fluorides of uranium, protactinium, zirconium, metallic corrosion products and fission products.

7. The method of claim 6 further comprising the step of contacting said formed molten salt with fluorine gas at a temperature of about 550° C. to volatilize uranium hexafluoride while maintaining in the molten salt phase non-volatile fluorides which include $^{231}$PaF$_4$; ZrF$_4$ and metal corrosion products.

References Cited

UNITED STATES PATENTS

| 3,577,225 | 5/1971 | Shaffer et al. | 23—325 |
| 2,84,0464 | 6/1958 | Wiswall | 75—84.1 A |
| 3,472,633 | 10/1969 | McNeese et al. | 23—325 |
| 3,275,422 | 9/1966 | Cathers et al. | 23—325 |

OTHER REFERENCES

Baries et al., Nucleonics, vol. 12, #7, pp. 16–19 (1954).
AEC document ORNL 4076 pp. 34–38 (1967).
AEC document ORNL 4254 pp. 152–55, 159–65 (1968).
Ferris et al., Transactions of the American Nuclear Society, vol. 12, #1, pp. 26–7 (1969).

CARL D. QUARFORTH, Primary Examiner

F. M. GITTES, Assistant Examiner

U.S. Cl. X.R.
75—84.1; 23—18, 22